H. W. WHITE.
Churn Dasher.

No. 229,784.    Patented July 6, 1880.

Attest:
Geo. T. Smallwood Jr.
Walter Allen

Inventor:
Hiram W. White
By Knight Bros.

UNITED STATES PATENT OFFICE.

HIRAM W. WHITE, OF YANKTON, DAKOTA TERRITORY.

CHURN-DASHER.

SPECIFICATION forming part of Letters Patent No. 229,784, dated July 6, 1880.

Application filed February 5, 1880.

*To all whom it may concern:*

Be it known that I, HIRAM W. WHITE, a citizen of the United States, residing at Yankton, in the county of Yankton, Dakota Territory, have invented certain new and useful Improvements in Churn-Dashers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The first part of my invention consists in a churn-dasher provided with a head having oblique wings and a diving-bell or air-chamber above.

My invention consists, further, in a dasher provided with two heads having oblique wings, forming, respectively, right and left screws, with the blades of one head placed directly below the intervals or spaces between the blades of the other head.

My invention consists, further, in a diving-bell or air-chamber constructed with perforations in its annular rim or margin and adapted to carry air down and distribute it equally into the body of the cream as the dasher descends.

Figure 1:
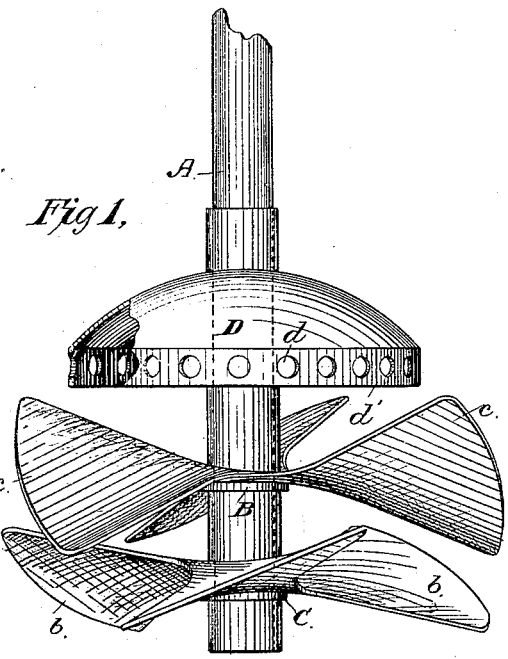
Figure 2:
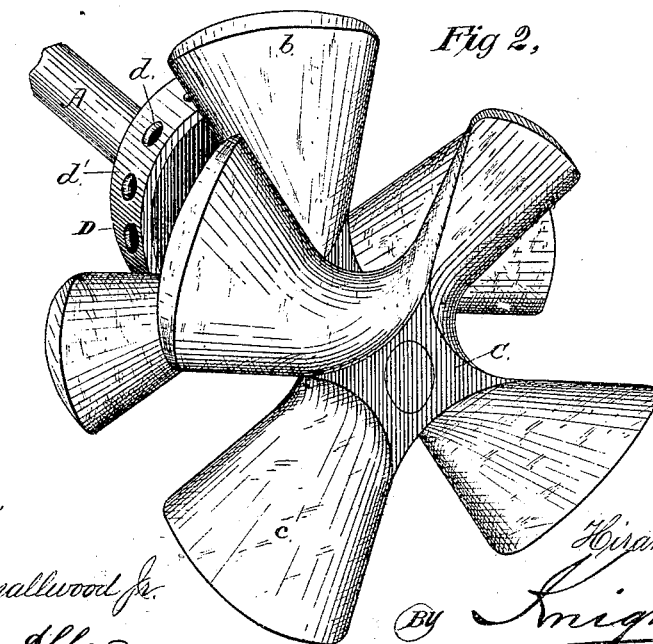

In the drawings, Figure 1 is a side view of a dasher illustrating my invention, with metallic diving-bell and heads. Fig. 2 is a perspective view of a dasher illustrating my invention, with wooden diving-bell and heads.

A may represent a dasher-rod, on which are secured one or more fixed heads, B C, one above the other, constructed with oblique wings *b c*, inclined so as to form right and left screws, respectively, the wings of one head being opposite the spaces of the other head. I use at times two or more pairs of these heads. Above these heads is mounted a diving-bell or air-chamber, D, constructed with perforations *d* in its annular rim or margin *d'*. This dasher is adapted for use in all the old styles of round or crock churns.

It will be found in practice that the fixed screw-heads produce a circular current and a counter circular current, and dash the cream or milk with great force against the walls of the churn. The air-chamber at the same time takes down a volume of air and produces great agitation, equally distributing the air through its perforated rim into the cream. I have found this equal distribution very important in practice.

I prefer to make the device of either wood, tin, or galvanized iron. It is simple in construction and inexpensive.

I am aware that propeller-wheels have been used, and do not, therefore, claim such, because I have found in practice that the cream revolves the wheels, and that they are therefore impracticable for my purpose, as revolving wheels do not rupture the globules, so as to free the butter.

I am aware that churn-dashers have before been made with oblique radial blades, both fixed and rotating, and also that a conical air-cup has before been combined with a dasher having radial blades. The peculiarity and superiority of my device consist, first, in combining two sets of outwardly-flaring blades fixed to the rod, one above the other, inclined in opposite directions, and with the blades of the upper set directly above the spaces between the blades of the lower set, the width of the blades being as large as or larger than the spaces between them; secondly, in combining with the aforesaid double set of blades an air-cup or bell fixed to the rod above the upper set of blades, and having a vertical margin pierced with radial openings.

The effect of the first of said improvements is to cause, as the dasher descends, forcible oblique currents from the under surfaces of the lower blades, which impinge against the under surfaces of the upper blades at right angles to said surfaces, or nearly so, and there meet opposing currents on the under surfaces of the upper blades, thus effecting a degree of agitation and concussion not heretofore produced by any vertically-reciprocating dasher having all of its parts readily accessible for cleansing. The width of the blades being as great or greater than the spaces between insures the entire body of cream being acted on in the most thorough manner.

The combined currents produced by the opposing surfaces of the two sets of blades are resolved into radial currents, which are projected outward against the walls of the churn with great force, and the cream being then driven upward by displacement is mingled with the radial jets of air projected from the apertures in the vertical margin of the air-cup. This last-described effect constitutes the beneficial feature of my second improvement.

Having thus described my invention, what I claim as new, and desire to secure by Letters Patent, is—

The combination of the two sets of stationary oblique blades $b\ b\ c\ c$, constructed and arranged as described, to produce oblique and radial currents, and the inverted cup D, constructed with a vertical margin pierced with apertures $d$, producing radial jets of air to mingle with said radial currents of cream and the resulting upward currents, as and for the purposes set forth.

HIRAM W. WHITE.

Witnesses:
  PHIL. K. FAULK,
  JOHN M. LYON.